(12) United States Patent
Harnden (10) Patent No.: US 11,199,645 B2
(45) Date of Patent: Dec. 14, 2021

(54) LOCATE OR TRACER WIRE GROUNDING TERMINAL

(71) Applicant: Tyler Harnden, Windsor, CO (US)

(72) Inventor: Tyler Harnden, Windsor, CO (US)

( * ) Notice: Subject to any disclaimer, the term of this patent is extended or adjusted under 35 U.S.C. 154(b) by 0 days.

(21) Appl. No.: 17/063,949

(22) Filed: Oct. 6, 2020

(65) Prior Publication Data

US 2021/0132248 A1    May 6, 2021

Related U.S. Application Data (60) Provisional application No. 62/937,367, filed on Nov. 19, 2019, provisional application No. 62/931,268, filed on Nov. 6, 2019.

(51) Int. Cl.
    *G01V 3/08*    (2006.01)
    *H02G 9/02*    (2006.01)

(52) U.S. Cl.
    CPC ............. *G01V 3/081* (2013.01); *H02G 9/02* (2013.01)

(58) Field of Classification Search
    CPC ... G01V 3/02; G01V 3/04; G01V 3/06; G01V 3/08; G01V 3/081; G01V 3/10; G01V 3/101; G01V 3/102; G01V 3/104; G01V 3/105; G01V 3/107; G01V 3/108;
    (Continued)

(56) References Cited

U.S. PATENT DOCUMENTS

| 4,736,158 A | * | 4/1988 | McCartney | G01R 31/60 |
| | | | | 324/66 |
| 6,062,914 A | * | 5/2000 | Fasano | H01H 71/08 |
| | | | | 361/634 |
| 7,367,748 B2 | | 5/2008 | Groebner et al. | |

(Continued)

OTHER PUBLICATIONS

Schonstedt, An Introduction to Magnetic & Utility Locating, obtained from https://www.schonstedt.com/wp-content/uploads/Locating_101_Handbook.pdf (Year: 2018).*

(Continued)

*Primary Examiner* — Douglas X Rodriguez
(74) *Attorney, Agent, or Firm* — Hall Estill Law Firm (57) ABSTRACT

A locate wire grounding terminal having a body for encapsulating various components of the locate wire grounding terminal, a switch for changing the locate wire grounding terminal between a grounded configuration and an ungrounded configuration, at least one locating terminal in electronic connectivity with the switch and one end of a section of tracer wire and a grounding lug in electronic connectivity with the switch. A locate wire grounding terminal device that includes a printed circuit board that can be incorporated into a locate wire terminal system, a switch attached to the printed circuit board to change the locate wire terminal system between a grounded configuration and an ungrounded configuration, at least one locating terminal attached thereto wherein the at least one locating terminal is in electronic connectivity with the switch and one end of a section of tracer wire. The device further includes a ground- (Continued)

ing lug attached to the printed circuit board and the at least one grounding lug is in electronic connectivity with the switch. Methods of using the terminal and device to locate tracer wire.

8 Claims, 10 Drawing Sheets

(58) Field of Classification Search
CPC ... G01V 3/12; G01V 3/15; G01V 3/16; G01V 3/165; G01V 3/17
See application file for complete search history.

(56) References Cited

U.S. PATENT DOCUMENTS

| | | | |
|---|---|---|---|
| 7,462,061 B2 | 12/2008 | Balfour | |
| 8,369,679 B2 | 2/2013 | Wakileh et al. | |
| 9,728,354 B2 | 8/2017 | Skolozdra et al. | |
| 2010/0059246 A1* | 3/2010 | Wakileh | G02B 6/4477 174/78 |
| 2015/0144468 A1* | 5/2015 | Skolozdra | H01H 31/003 200/16 R |
| 2017/0077597 A1* | 3/2017 | Gong | H04W 4/80 |
| 2018/0337500 A1* | 11/2018 | Whipple | H01R 27/02 |
| 2020/0083617 A1* | 3/2020 | Moore | H01R 4/66 |

OTHER PUBLICATIONS

Tracer Wire Technologies Product page, obtained from https://www.tracerwiretech.com/grounding-tracer-wire/, obtained on Jan. 19, 2021.*
Tracer Wire Technologies About page, obtained from https://www.tracerwiretech.com/locating-tracer-wires/, obtained on Jan. 19, 2021.*
Definition for printed circuit board, IEEE 100 The Authoritative Dictionary of IEEE Standards Terms, Seventh Edition, p. 866, year 2000.*

* cited by examiner

LOCATE OR TRACER WIRE GROUNDING TERMINAL

CROSS-REFERENCE TO RELATED APPLICATIONS

The present application is a conversion of U.S. Provisional Application having U.S. Ser. No. 62/931,268, filed Nov. 6, 2019 and U.S. Provisional Application having U.S. Ser. No. 62/937,367, filed Nov. 19, 2019, which claim the benefit under 35 U.S.C. 119(e). The disclosures of which are hereby expressly incorporated herein by reference.

STATEMENT REGARDING FEDERALLY SPONSORED RESEARCH OR DEVELOPMENT

Not applicable.

BACKGROUND OF THE DISCLOSURE

1. Field of the Invention

The present disclosure relates to a locate wire grounding terminal for improved accuracy and enhanced locating capabilities for locating tracer wires and other wire locate systems.

2. Description of the Related Art

A typical utility line locating instrument is composed of two primary devices; a transmitter and a receiver. The transmitter generates an electromagnetic field around a conductor (tracer wire or locate wire) either through a direct connection to the conductor or by means of induction based on the proximity of the transmitter to the conductor. The transmitter provides various frequencies by which the signal is generated. Low frequencies generate small electromagnetic fields which tend to remain on the intended targets whereas higher frequencies generate large electromagnetic fields that have a tendency to bleed-over onto nearby conductors and can impact the accuracy of a locate. Low frequencies can only be utilized through a direct connection to a well-grounded conductor and are not able to be induced. The receiver is simply a way to interpret the signals generated by the transmitter. A technician can increase or decrease the sensitivity of the receiver, but the transmitter's configuration is the primary factor that influences the ability to accurately locate a conductor.

Tracer wire is a conductive wire buried with non-metallic pipelines and other utilities for the purpose of locating. It is typically installed in 500-2500 foot sections. The ends are usually brought above grade at these junctures and left exposed or lying in the weeds which compromises tracer wire locates and leaves the wires subject to environmental damage. Because a transmitter requires a metallic conductor to generate the electromagnetic signal, locating non-metallic pipelines and other utilities is ineffective without the use of tracer wire. With regard to locating underground utilities, a conductor is any metallic device that can emit an electromagnetic field. This can include, but is not limited to buried metallic pipelines and other buried wires such as CATV, power lines, telecom wires, or other tracer wire.

When locating underground utilities, accuracy is best achieved by using low frequency which requires a dedicated grounding source. This is because low frequency signal tends to remain on the intended conductor and typically generates a uniform electromagnetic field for the receiver to accurately interpret. Low frequency is also much less likely to bleed-over on to other nearby conductors, as is the case with high frequency. When bleed-over occurs, the electromagnetic field is likely to bend and distort which will not provide the receiver an accurate signal to locate.

Accordingly, there is a need for an apparatus that can allow for more efficient location of tracer wire (locate wire) used with non-metallic pipelines by providing interruptible grounding and isolation.

SUMMARY OF THE DISCLOSURE

The present disclosure is directed to a locate wire grounding terminal having a body for encapsulating various components of the locate wire grounding terminal. The terminal also includes a switch for changing the locate wire grounding terminal between a grounded configuration and an ungrounded configuration. The locate wire grounding terminal has at least one locating terminal in electronic connectivity with the switch and one end of a section of tracer wire and a grounding lug in electronic connectivity with the switch.

The present disclosure is also directed to a locate wire grounding terminal device that includes a printed circuit board that can be incorporated into a locate wire terminal system. The locate wire grounding terminal device includes a switch attached to the printed circuit board to change the locate wire terminal system between a grounded configuration and an ungrounded configuration. The printed circuit board has at least one locating terminal attached thereto wherein the at least one locating terminal is in electronic connectivity with the switch and one end of a section of tracer wire. The locate wire grounding terminal device further includes a grounding lug attached to the printed circuit board and the at least one grounding lug is in electronic connectivity with the switch.

The present disclosure is directed to a method of locating a tracer wire. A first locate wire terminal system is installed at a first end of a section of tracer wire and a second locate wire terminal system is installed at a second end of the section of tracer wire. The second locate wire terminal system at the second end of the section of tracer wire is then insured to be in a grounded position. The first locate wire terminal system is switched into an ungrounded position. Once the first locate wire terminal system has been switched to the ungrounded position, the transmitter can be connected to the section of tracer wire and located using a low frequency.

DETAILED DESCRIPTION OF THE DISCLOSURE

Figure 1:
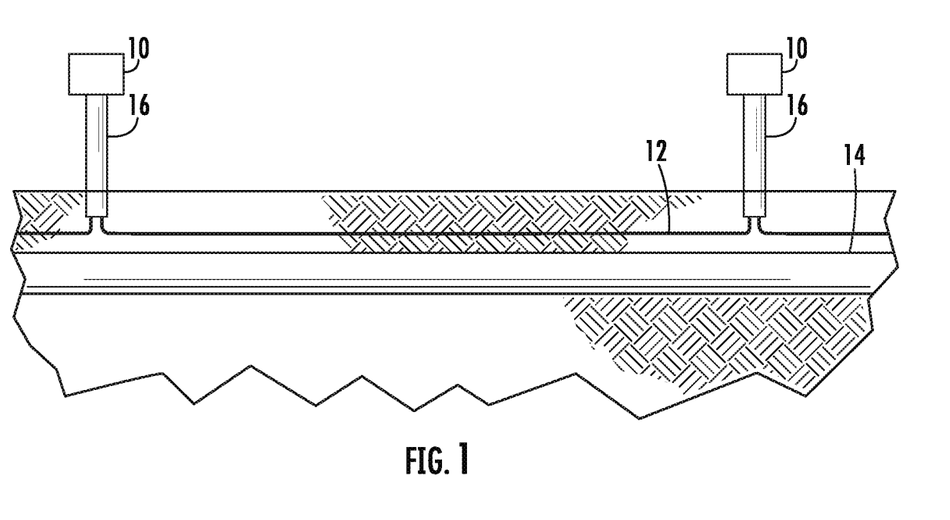
FIG. 1 is a side elevation view of a system that incorporates a locate wire grounding terminal constructed in accordance with the present disclosure.
Figure 2:
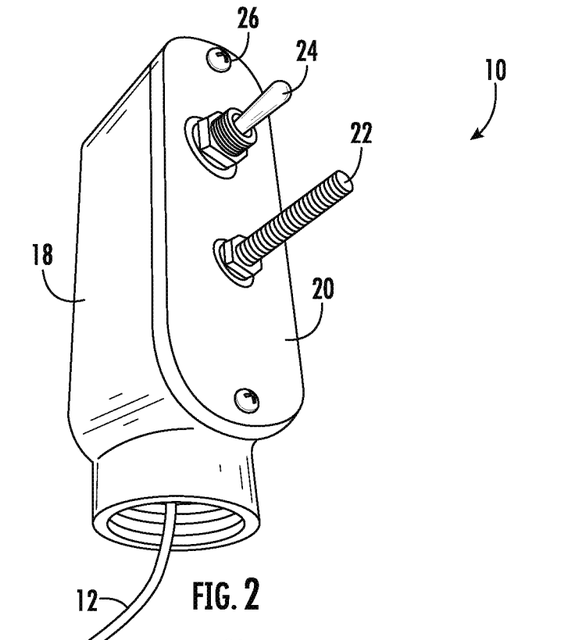
FIG. 2 is a perspective view of a locate wire grounding terminal constructed in accordance with the present disclosure.
Figure 3:
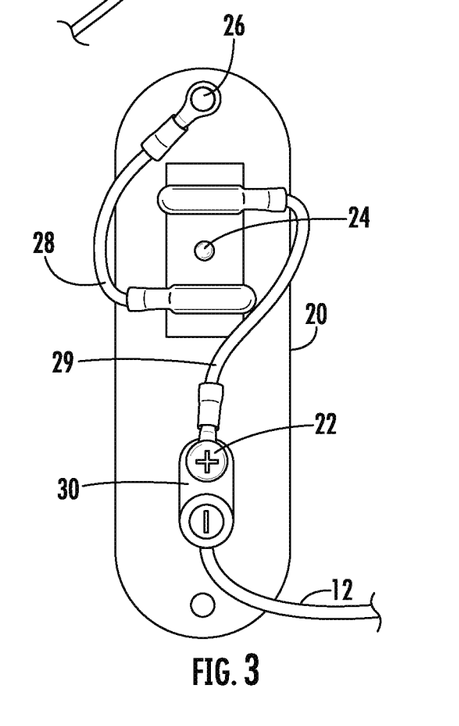
FIG. 3 is a side elevation view of a portion of the locate wire grounding terminal shown in FIG. 2 and constructed in accordance with the present disclosure.
Figure 4:
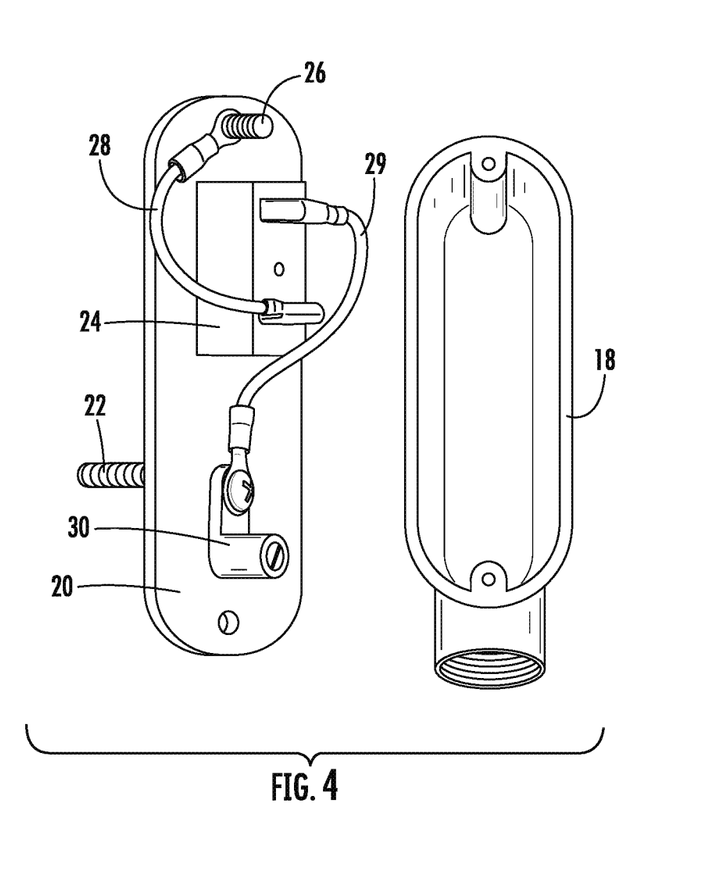
FIG. 4 is a perspective view of the locate wire grounding terminal shown in FIG. 2, opened and constructed in accordance with the present disclosure.
Figure 5:
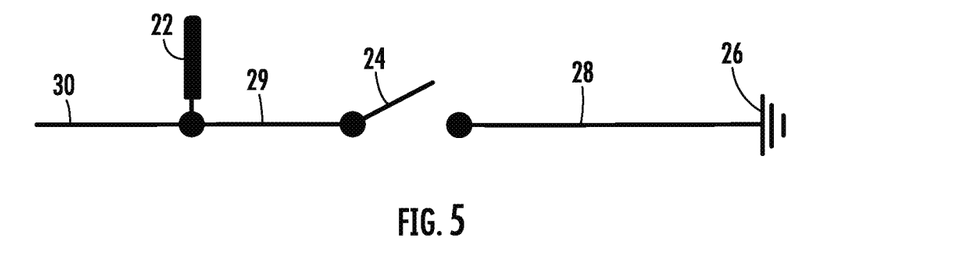
FIG. 5 is a wiring diagram of the locate wire grounding terminal shown in FIG. 2 and constructed in accordance with the present disclosure.
Figure 6:
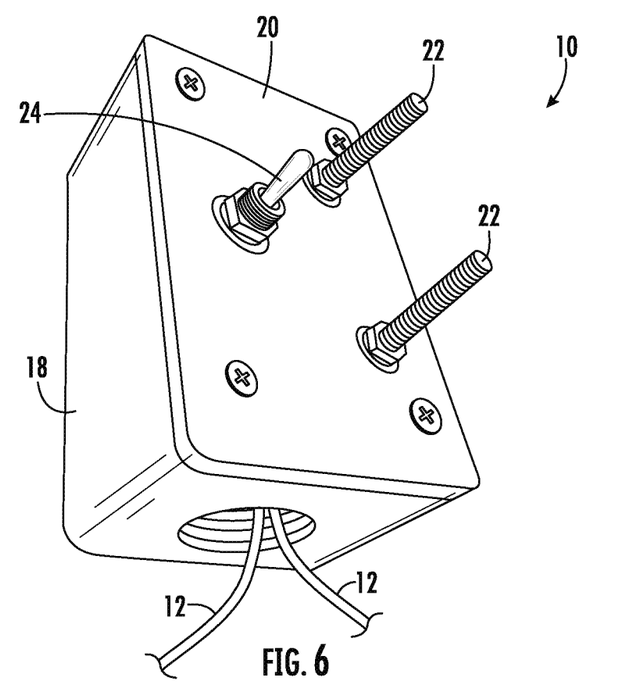
FIG. 6 is a perspective view of another embodiment of a locate wire grounding terminal constructed in accordance with the present disclosure.
Figure 7:
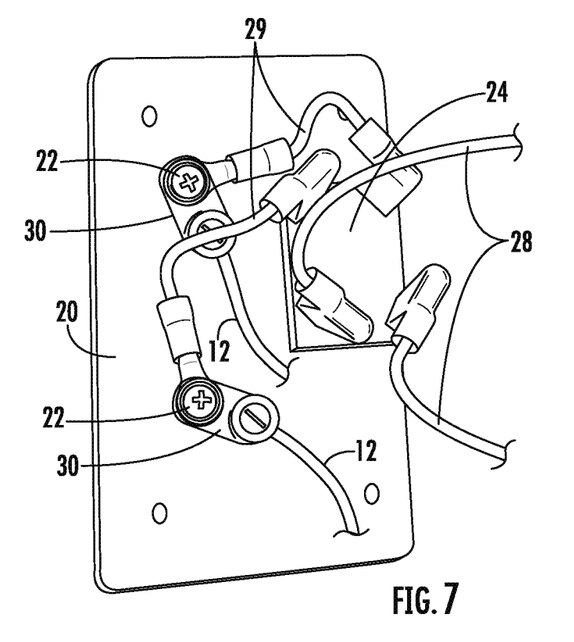
FIG. 7 is a side elevation view of a portion of the locate wire grounding terminal shown in FIG. 6 and constructed in accordance with the present disclosure.
Figure 8:
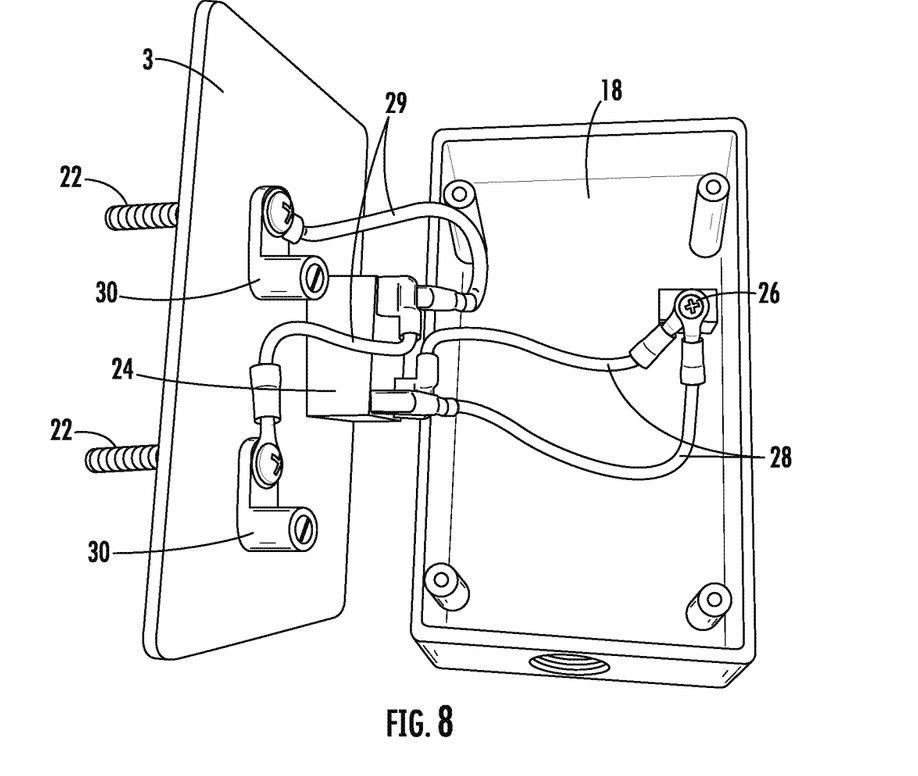
FIG. 8 is a perspective view of the locate wire grounding terminal shown in FIG. 6, opened and constructed in accordance with the present disclosure.
Figure 9:
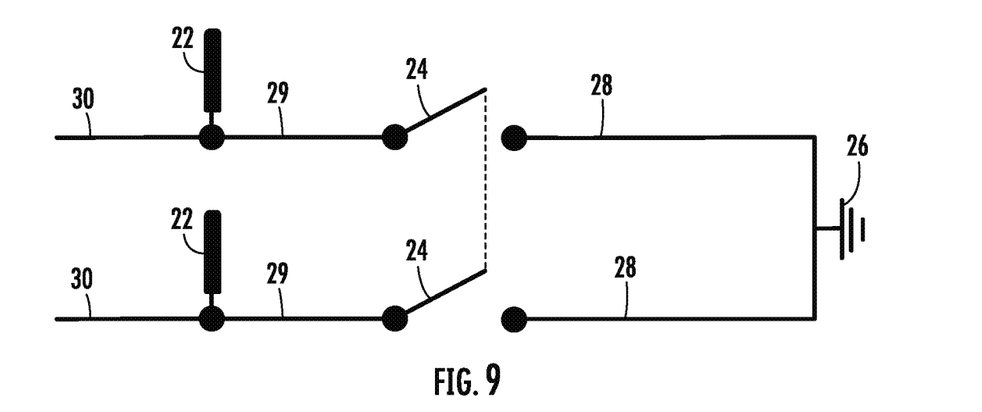
FIG. 9 is a wiring diagram of the locate wire grounding terminal shown in FIG. 6 and constructed in accordance with the present disclosure.
Figure 10:
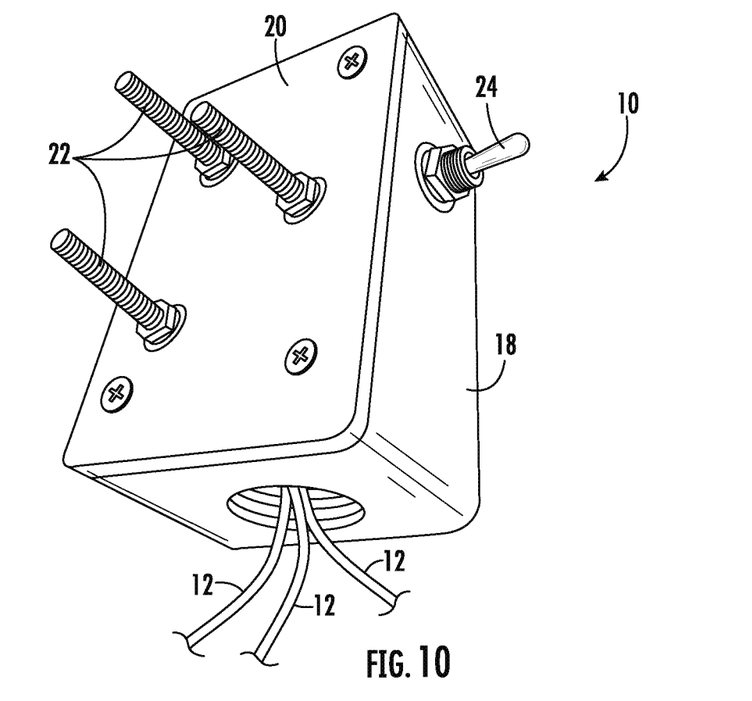
FIG. 10 is a perspective view of a further embodiment of a locate wire grounding terminal constructed in accordance with the present disclosure.
Figure 11:
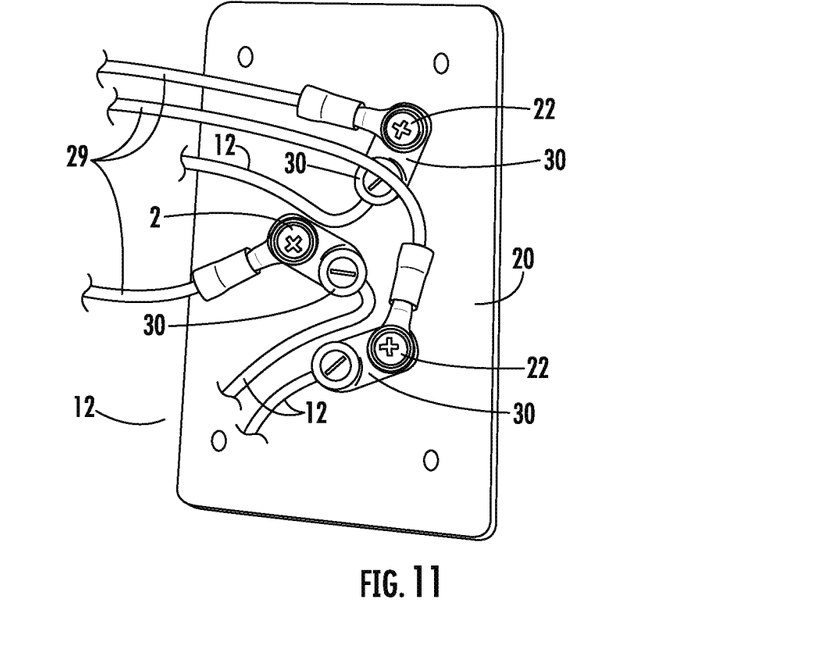
FIG. 11 is a side elevation view of a portion of the locate wire grounding terminal shown in FIG. 10 and constructed in accordance with the present disclosure.
Figure 12:
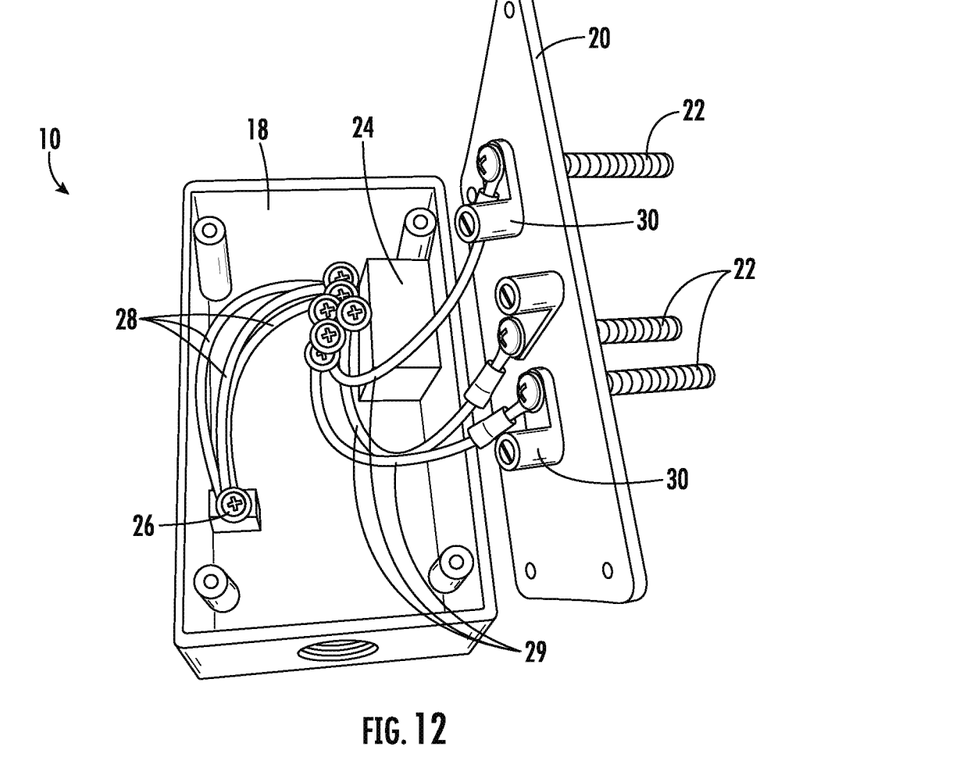
FIG. 12 is a perspective view of the locate wire grounding terminal shown in FIG. 10, opened and constructed in accordance with the present disclosure.
Figure 13:
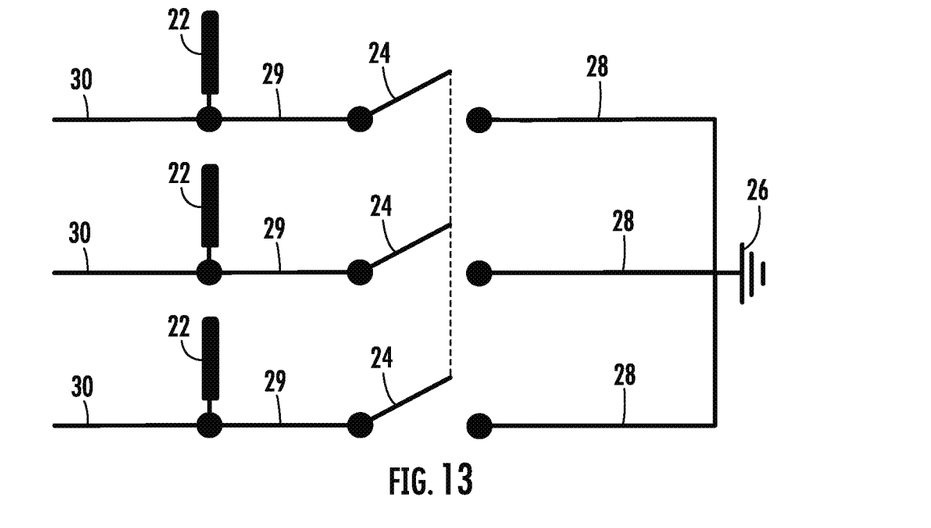
FIG. 13 is a wiring diagram of the locate wire grounding terminal shown in FIG. 10 and constructed in accordance with the present disclosure.

The present disclosure relates to an interruptible locate wire grounding terminal 10 for improved accuracy and enhanced locating capabilities for tracer wire 12 (or locate wire). A section of tracer wire 12 can be buried underground with a utility or a non-metallic pipe 14 and can be coupled to a locate wire grounding terminal 10 on each end of the tracer wire 12. The locate wire grounding terminal 10 can be attached to a bare, rigid metal conduit or grounding rod 16 that is partially buried underground. The tracer wire 12 at the end of a particular section of tracer wire 12 extends up through the grounding rod 16, which protects it from environmental damage, and connects it to the locate wire grounding terminal 10 using the connection element 30. It should be understood and appreciated that the end of each section of tracer wire 12 could extend up through a grounding rod 16 and be coupled to a locate wire grounding terminal 10.

In one embodiment of the present disclosure shown in more detail in FIGS. 2-5, the locate wire grounding terminal 10 includes a metallic body 18 and a polycarbonate faceplate 20 securable to the body 18 to house and support various components of the locate wire grounding terminal 10. The body 18 can be secured to one end of the grounding rod 16. The locate wire grounding terminal 10 shown in FIGS. 2-5 includes one locating terminal 22 and a switch 24. The switch 24 toggles between the tracer wire 12 being grounded and ungrounded. The tracer wire 12 is connected to the connection element 30 which in turn is connected to the switch 24 via a ground wire 29. The locate wire grounding terminal 10 also has a screw 26 to secure the faceplate 20 to the body 18. The screw 26 is connected to the switch 24 via a ground wire 28. When the switch 24 is flipped to the grounded position, the tracer wire 12 is grounded through the ground wire 29 via the connections of the ground wire 28 to the screw 26, the body of the locate wire grounding terminal 10 and the ground rod 16.

When the switch 24 is in the ungrounded position, the switch 24 is preventing the tracer wire 12 from being grounded. The polycarbonate faceplate 20 insulates the screw 26 from the connection element 30 which permits the switch 24 to toggle from the grounded position and the ungrounded position.

In a further embodiment of the present disclosure shown in more detail in FIGS. 6-9, the locate wire grounding terminal 10 includes two locating terminals 22 to facilitate the junction of two tracer wires 12 to the same location. One of the locating terminals 22 can be for the tracer wire 12 associated with an upstream section of a tracer wire system and the other locating terminal 22 can be for tracer wire associated with a downstream section of a tracer wire system. The second locating terminal 22 can be set up similarly to the locate wire grounding terminal 10 with the single locating terminal 22 described herein. The second locating terminal 22 can be electronically coupled to the switch 24 via separate terminal wire 28 and be coupled to the tracer wire 12 via a second connection element 30 creating a second connection point.

In a further embodiment of the present disclosure shown in more detail in FIGS. 10-13, the locate wire grounding terminal 10 includes three locating terminals 22 to facilitate the junction of three tracer wires 12 to the same location. Similar to the two tracer wire 12 system described herein, one of the locating terminals 22 can be for the tracer wire 12 associated with an upstream section of a tracer wire system and the other locating terminal 22 can be for tracer wire associated with a downstream section of a tracer wire system. The third locating terminal 22 can be for a tracer wire associated with a lateral segment of a tracer wire system. Similar to the second locating terminal, the third locating terminal 22 can be set up similarly to the locate wire grounding terminal 10 with the double locating terminal 22 described herein. The third locating terminal 22 can be electronically coupled to the switch 24 via separate terminal wire 28 and be coupled to the tracer wire 12 via a third connection element 30 creating a third connection point.

In use, a locate wire grounding terminal 10 can be coupled to one end of a tracer wire 12 and coupled to a grounding rod 16. The other end of the same tracer wire 12 can be coupled to another locate wire grounding terminal 10, which is coupled to a separate grounding rod. The default position for the locate wire grounding terminal 10 is grounded. This ensures that the far-end of each tracer wire 12 segment is grounded. When it is desired to locate a section of tracer wire 12 coupled to these two locate wire grounding terminals 10, the switch 24 of the locate wire grounding terminal 10 where the transmitter is directly connected is set to the ungrounded configuration. With every device, when the switch is in the grounded position (down) all terminations become electrically common and grounded. Conversely, when the switch is in the ungrounded position (up), all terminations are ungrounded and electrically isolated from one another. This allows the user to connect a transmitter to the intended tracer wire and transmit 100% of the transmitter's energy down the wire rather than simply letting the transmitter's energy route to the best ground. Low frequency typically provides more accurate locates, particularly in congested areas. It should be understood and appreciated that any version of the previously described locate wire grounding terminals 10 can be used on both ends of a section of tracer wire 12.

In another embodiment of the present disclosure shown in more detail in FIGS. 14-17, the locate wire grounding terminal 10 can include a printed circuit board (PCB) body 32 having a grounding lug 34, at least one locating terminal 36 electronically connected thereto and a switch 38 for switching the tracer wire grounding terminal 10 from a grounded to an ungrounded configuration. The PCB body 32 can be used in an existing ground terminal system, provided no foreign grounds exist in the system. Each tracer wire 12 entering the existing system can be electronically attached to one of the locating terminals 36 of the PCB body 32. The grounding lug 34 of the PCB body 32 can be electronically connected to the switch 38 by a copper trace line 40 embedded in the PCB body 32. Similarly, the locating terminals 36 are electronically connected to the switch via separate copper trace lines 40. The grounding lug 34 must be grounded to a dedicated ground source. The grounding wire could be attached to a sacrificial anode (typically magnesium or zinc) or a ground rod that extends an appropriate depth into the ground as long as it's not attached to another utility.

Figure 14:
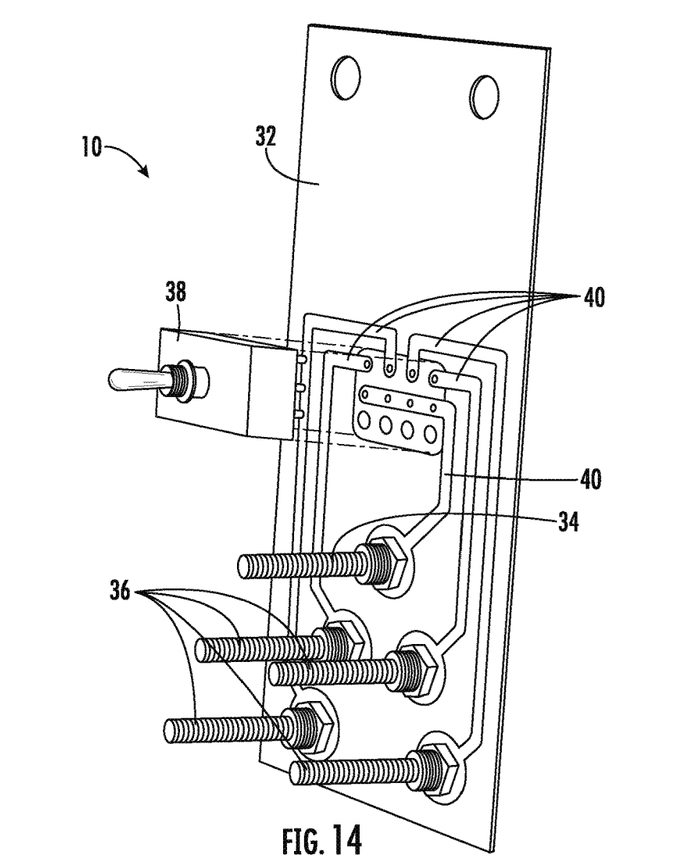
FIG. 14 is an expanded view of yet another embodiment of a locate wire grounding terminal constructed in accordance with the present disclosure.
Figure 15:
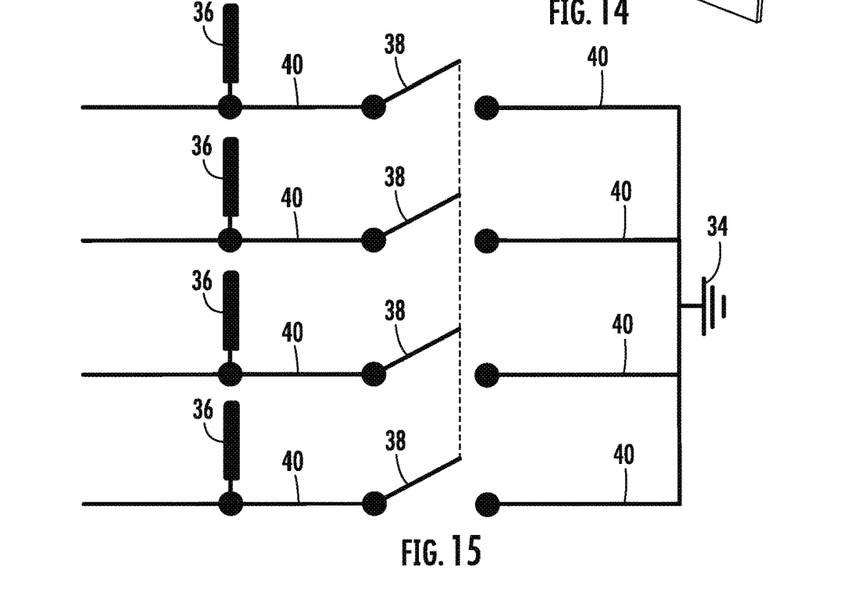
FIG. 15 is a wiring diagram of the locate wire grounding terminal shown in FIG. 14 and constructed in accordance with the present disclosure.
Figure 16:
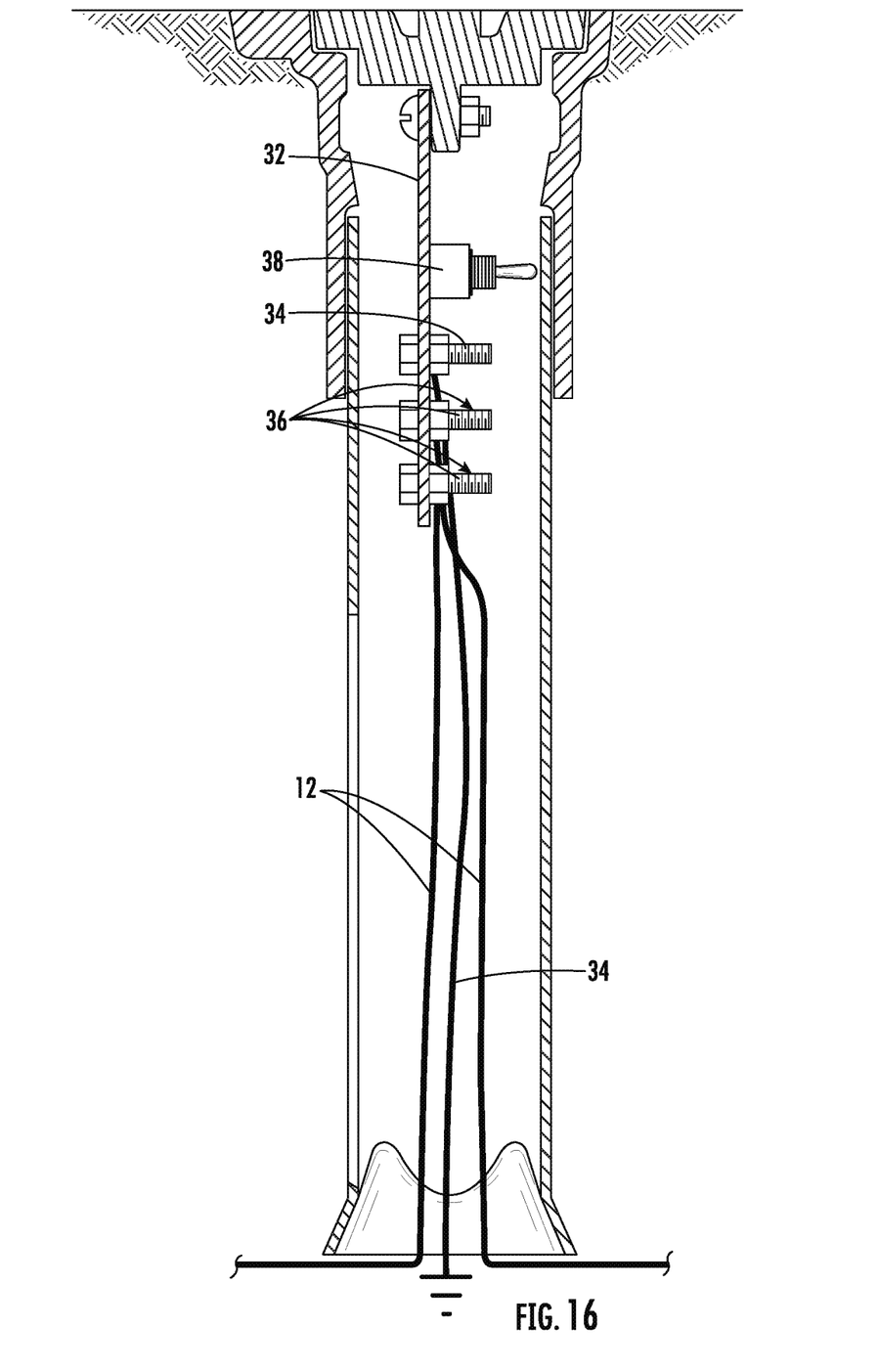
FIG. 16 is a cross-sectional view of the locate wire grounding terminal shown FIG. 14, inside a flush mount access box constructed in accordance with the present disclosure.

In another embodiment shown in FIG. 14, the locate wire grounding terminal 10 can include a second grounding lug 42. In this embodiment, the locate wire grounding terminal 10 is provided with a second means for insuring the locate wire grounding terminal 10 is grounded when the switch 38 is in the grounded position.

Similar to the embodiments of the locate wire grounding terminal 10 previously discussed herein, the locate wire grounding terminal 10 incorporating the PCB body 32 operates similarly. The locate wire grounding terminal 10 associated with the near-end of a desired section of tracer wire 12 can be switched to the ungrounded position and the locate wire grounding terminal 10 associated with the far-end of the desired section of tracer wire 10 is left in the grounded configuration. Having the near-end of the section of tracer wire 12 ungrounded and the far-end of the section of tracer wire 12 grounded allows the user to connect a transmitter to the near end of the section of tracer wire 12 and perform the locate using low frequency. After a successful locate job is completed for a desired section of tracer wire 12, both the locate wire grounding terminals 10 on each end of the section of locate wire are switched to the grounded position.

Figure 17:
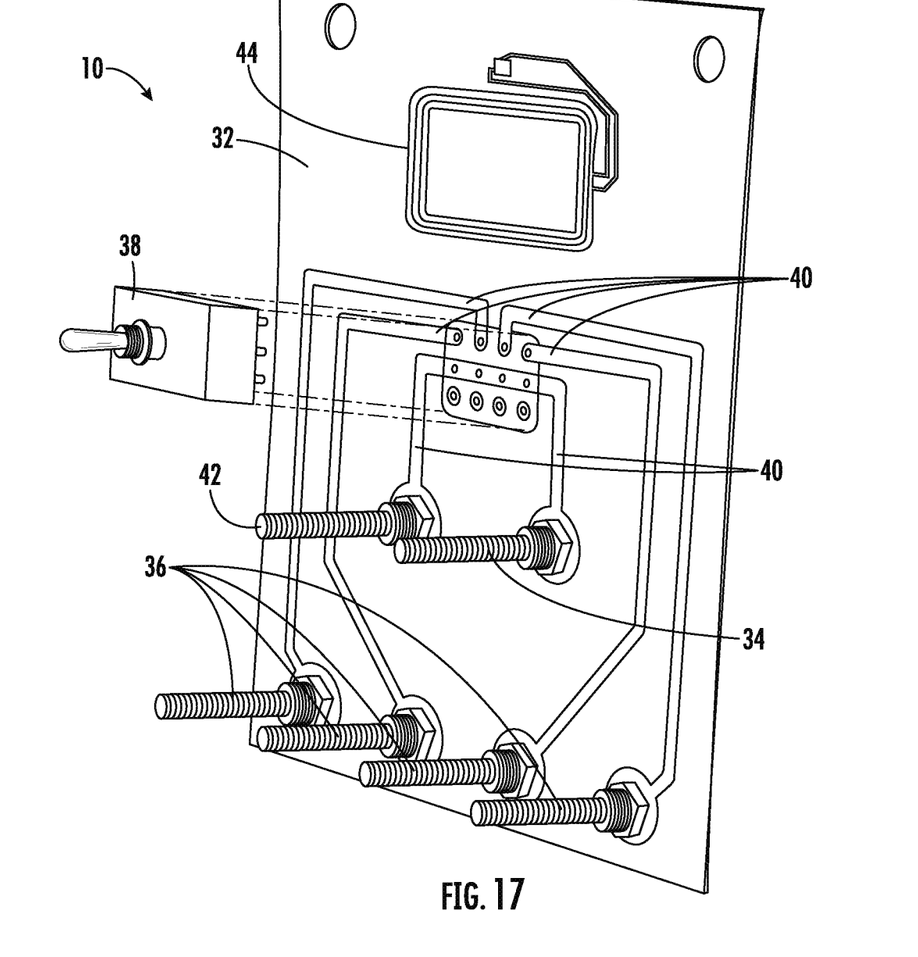
FIG. 17 is an expanded view of another embodiment of the locate wire grounding terminal for use in an above ground enclosure depicting the RFID component for added identification and location capabilities, constructed in accordance with the present disclosure.

In yet another embodiment of the present disclosure, the locate wire grounding terminal 10 can include a near field communication (NFC) component 44. The NFC component 44 can be imbedded in the PCB body 32 to allow NFC compatible devices to scan available data stored on the NFC. Data stored on the NFC component 44 can include, but is not limited to, GPS coordinates, information relative to geographic information systems (GIS), utility company information, or any other information describable. In one embodiment, the NFC component 44 can be password protectable so that the information stored thereon is protected and can only be accessed or altered by someone with permission to access or alter the data stored on the NFC component 44.

From the above description, it is clear that the present disclosure is well adapted to carry out the objectives and to attain the advantages mentioned herein as well as those inherent in the disclosure. While presently preferred embodiments have been described herein, it will be understood that numerous changes may be made which will readily suggest themselves to those skilled in the art and which are accomplished within the spirit of the disclosure and claims.

What is claimed is:

1. A locate wire grounding terminal device, the locate wire grounding terminal device comprising:
   a printed circuit board capable of being used in an operation to locate a section of tracer wire;
   a switch physically supported by the printed circuit board to change the section of tracer wire between a grounded configuration and an ungrounded configuration;
   at least one locating terminal attached to the printed circuit board, the at least one locating terminal in electronic connectivity with the switch and capable of being in electronic connectivity with one end of the section of tracer wire; and
   a grounding lug attached to the printed circuit board, the grounding lug in electronic connectivity with the switch.

2. The locate wire grounding terminal device of claim 1 wherein the locate wire grounding terminal device has a plurality of locating terminals attached to the printed circuit board and each locating terminal is configured to be electrically connected to a separate section of tracer wire.

3. The locate wire grounding terminal device of claim 1 wherein the locate wire grounding terminal device further includes a near field communication component imbedded into the printed circuit board for storing data.

4. The locate wire grounding terminal device of claim 1 wherein the locate wire grounding terminal device includes a second grounding lug attached to the printed circuit board.

5. A method of locating a tracer wire, the method comprising:
   providing a first locate wire grounding terminal device at a first end of a section of tracer wire, the locate wire grounding terminal device comprising:
      a printed circuit board capable of being used in an operation to locate a section of tracer wire;
      a switch physically supported by the printed circuit board to change the section of tracer wire between a grounded configuration and an ungrounded configuration;
      at least one locating terminal attached to the printed circuit board, the at least one locating terminal in electronic connectivity with the switch and one end of the section of tracer wire; and
      a grounding lug attached to the printed circuit board, the grounding lug in electronic connectivity with the switch;
   providing a second locate wire grounding terminal device at a second end of the section of tracer wire;
   ensuring the second locate wire grounding terminal device at the second end of the section of tracer wire is in a grounded position;
   switching the first locate wire grounding terminal device into an ungrounded position;
   locating the section of tracer wire using a low frequency transmitter.

6. The method of claim 5 wherein the locate wire grounding terminal device has a plurality of locating terminals attached to the printed circuit board and each locating terminal is configured to be electrically connected to a separate section of locate wire.

7. The method of claim 5 wherein the locate wire grounding terminal device further includes a near field communication component imbedded into the printed circuit board for storing data.

8. The method of claim 5 wherein the locate wire grounding terminal device includes a second grounding lug attached to the printed circuit board.

* * * * *